June 20, 1933.    G. W. FRANZEN    1,914,366
BRAKE
Filed Feb. 24, 1930    2 Sheets-Sheet 1
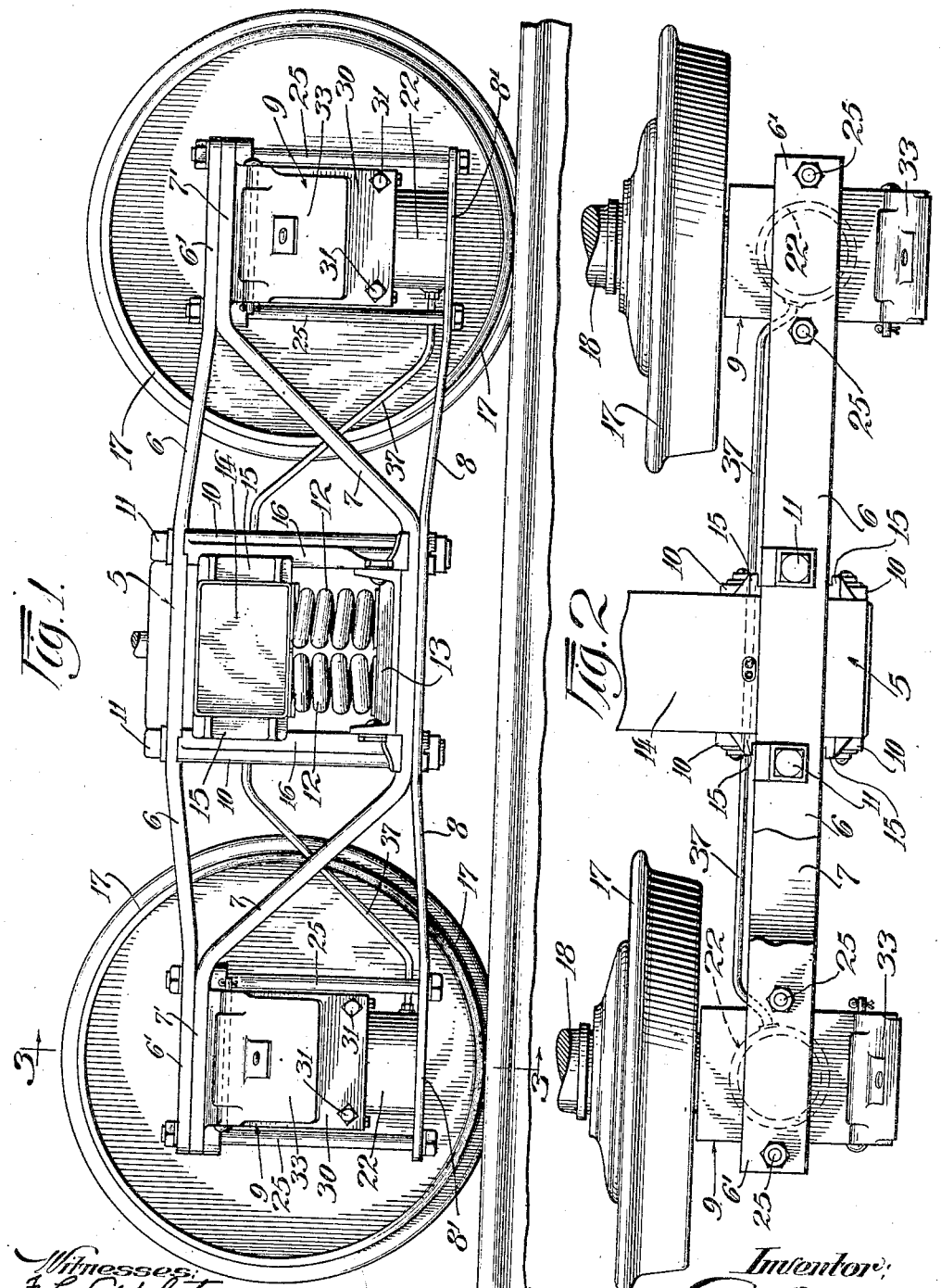

June 20, 1933.　　　　G. W. FRANZEN　　　　1,914,366
BRAKE
Filed Feb. 24, 1930　　　2 Sheets-Sheet 2
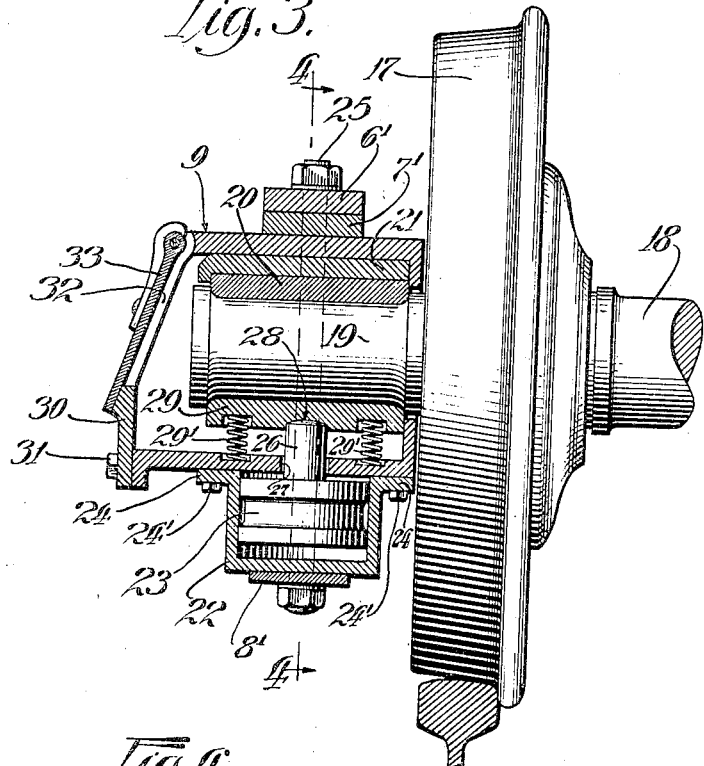
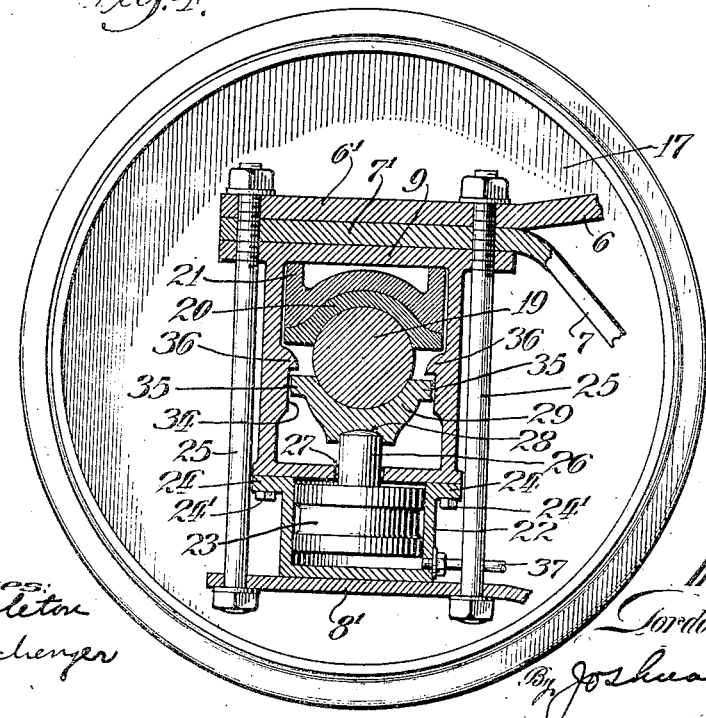

Patented June 20, 1933

1,914,366

UNITED STATES PATENT OFFICE

GORDON W. FRANZEN, OF CHICAGO, ILLINOIS

BRAKE

Application filed February 24, 1930. Serial No. 430,700.

This invention relates to brakes, and more particularly to brakes for use on railway cars and the like. It has for its principal objects to provide for a direct application of the braking force to the axle instead of the peripheral face of the tire or tread portion of the wheel, whereby to reduce wear on the wheel and prevent the creation of brake-shoe dust; to eliminate the usual system of levers and minimize the number of other mechanical parts required in the ordinary brake mechanism; and to attain certain advantages which will more fully appear in the following description.

The invention consists in the parts, and in the combinations and arrangements of parts as hereinafter described and pointed out with particularity in the appended claims.

In the accompanying drawings, illustrating an adaptation of the invention,—

Fig. 1 is a side view of a railway car truck equipped with braking means in accordance with the present invention;

Fig. 2 is a top plan view of one side portion of the car truck parts illustrated in Fig. 1;

Fig. 3 is a section, on an enlarged scale, taken on or about the line 3—3 of Fig. 1; and Fig. 4 is a cross-section, taken on or about the line 4—4 of Fig. 3.

Referring now to the drawings, the numeral 5 designates generally the side frame of a car truck, which, as illustrated, is of the usual freight car type. The side frame comprises the upper compression member 6, the suspension member or truss 7, and the lower tie member 8. The end portions 6' and 7' of the members 6 and 7 are supported on top of the journal box, which is designated generally by the numeral 9. The middle portion of the upper member 6 is supported on the column-guide frame 10, while the middle portion of the member 7 is carried under said frame 10, as also is the middle portion of the lower member 8, said members 6, 7 and 8 being securely held in their structural relation with the frame 10 by the usual column-bolts 11. Mounted on the regular springs 12, which are supported on the spring-seat member 13, is the usual transverse bolster 14 having grooved lateral extensions 15 which slidably engage the vertical column-guides 16 of said frame 10..

As illustrated, the wheels 17 are mounted in the usual way upon the axles 18, said axles having the regular journal extensions 19 which enter the journal box 9. The journals 19 are provided with the usual anti-friction members or brasses 20, between which latter and the top of the journal box 9 is interposed the usual wedge-block 21.

As thus far described, the truck frame and journal box structures are of the usual or ordinary type and, as far as the present invention is concerned, there is no specific limitation as to these features. In the application of the present invention, however, certain alterations in the journal box structure are necessary, and the particular construction and arrangement shown in the drawings is merely for the purpose of illustration and, obviously, these details may be modified considerably from time to time in carrying the invention into effect.

On the under side of each journal box 9 is provided an air cylinder 22, in which works a piston 23, said cylinder, as shown, having an annular flange 24 which is bolted, as at 24', to the bottom of the journal box. This cylinder, as shown, is further supported by the end portion 8' of the tie member 8 of the truck frame, said end portion 8' being secured in the structure, together with the end portions of the members 6 and 7, by the column-bolts 25.

As shown, the piston 23 is provided with an axial extension 26 at its upper end, said extension working through an opening 27 provided therefor in the bottom of the journal box 9. The end portion of the piston extension 26 is preferably rounded somewhat as shown and is engaged in a recess 28 provided therefor at or about the center of a brake shoe or member 29, said brake shoe being concaved transversely corresponding to the circumference of the journal 19 and being of a length substantially the same as the bearing portion of said journal. Preferably, this brake shoe is further supported near its opposite ends on springs 29', said springs being of sufficient strength to yieldably hold said brake shoe in contact with the journal 19 so as to prevent rattling but not exert any appreciable pressure to create undue frictional resistance between said shoe and journal.

Obviously, the bearing element 20 or brass, as it is more commonly termed in the art, is of anti-friction character and the journal usually runs in oil or in contact with some other suitable lubricant and, of course, it may be desirable or necessary to maintain the lubrication of the journal in the application of the present invention. Obviously, therefore, the brake shoe 29 should be constructed of or surfaced with a metallic alloy or other suitable material which will have the requisite frictional resistance to produce the proper braking effect when forced into engagement with the journal 19 under pressure, this material, of course, being also of such character that it will not mar the bearing surface of the journal.

To facilitate inserting and removing the brake shoe member 29 it is preferable to provide the journal box with a removable end wall 30 which is held in place by suitable bolts 31, said end wall having an opening 32 similar to the ordinary journal box, which is provided with the usual hinged cover 33. In order to guide the brake shoe 29 in its vertical movement, and also to prevent it from rotating with the journal portion of the axle, the side walls of the journal box are provided with ribs or raised guides 34 which are slidably engaged by the oppositely extending laterally flanged portions 35 of the brake shoe, and, as a further limitation of the rotative movement of the brake shoe, overhanging shouldered portions 36 are provided on the inner faces of the side walls of the journal box at the upper ends of said vertical ribs or guide extensions 34, there being, of course, sufficient normal clearance between the upper marginal portions of said brake shoe and said overhanging stops 36 to permit the proper functioning of the brake shoe when pressure is applied thereto.

In practice, the compressed air is supplied to the cylinder 22 from the same source as that which is employed in the ordinary air brake equipment of railway cars and the like, and in the connections there will be provided the usual regulating and controlling valves or devices. Therefore, for the purposes of illustration, a supply pipe having branches 37 leading to the respective air cylinders 22 is shown more or less schematically in the drawings, as the particular arrangements for controlling the air supply are not specifically concerned in the present invention.

The present invention comprehends broadly the application of the braking element directly to the axle of a car or other vehicle instead of the peripheral or other portion of the wheel, and preferably to the journal portion of the axle, but without specific limitation to that particular application of the brake. It is, of course, understood that suitable provision is to be made for equalizing as near as possible the braking power and effect of the several separate devices that are individually applied to the respective journal portions of the axle, as shown.

Obviously, the invention admits of considerable modification in its structural arrangements and operation without departing from its spirit and scope as defined by the appended claims.

Having thus described my invention, what I claim as new and desire to secure by Letters Patent is:

1. In combination with a railway car axle or the like, a journal bearing and opposed means for creating a braking effect directly upon the journal bearing engaging portion of the axle.

2. In combination with a journal box, the journal portion of an axle within said box, a supporting bearing element between the upper portion of said box and said journal portion of the axle, a brake shoe in the lower portion of said journal box engageable directly with said journal portion of the axle in opposed relation to the supporting bearing element, and means for exerting pressure on said brake element to create a braking effect between the same and said journal portion of the axle.

3. In a pneumatic brake for railway cars and the like, the combination with a journal box in which the journal portion of the car axle is afforded a bearing for supporting the car, a brake member movably mounted in said journal box in opposed relation to said supporting bearing and in cooperative relation to the journal portion of the axle, an air cylinder mounted on said journal box, and a piston in said air cylinder in cooperative relation to said brake member and adapted to move said brake member into braking engagement with the journal portion of the car axle.

4. In combination with a journal box, the journal portion of a car axle within said box, and a bearing element interposed between the top portion of said car axle journal and the top of the journal box, a brake-shoe vertically movable in the lower portion of said journal box in cooperative relation to the under side of the car axle journal, means for guiding said brake-shoe in its vertical movement and restricting the rotative movement thereof, an air cylinder on said journal box, a piston in said cylinder, and means whereby said piston, under pressure, presses said brake-shoe in braking engagement with said car axle journal.

5. In a pneumatic brake for railway cars and the like, in combination with a journal box, the journal portion of a car axle within said box, a brake-shoe vertically movable in the lower portion of said journal box in cooperative relation to the under side of the car axle journal, means for guiding said brake-shoe in its vertical movement and for restricting the rotative movement thereof, said means including oppositely extending portions on said brake-shoe, and ribs on the side walls of the journal box adapted to register with the oppositely extending portions of the brake-shoe, an air cylinder on said journal box, a piston in said cylinder, and means whereby said piston under pressure presses said brake-shoe in braking engagement with said car axle journal.

6. In a pneumatic brake for railway cars and the like, in combination with a journal box, the journal portion of a car axle within said box, a brake-shoe vertically movable in the lower portion of said journal box in cooperative relation to the under side of the car axle journal, means for guiding said brake-shoe in its vertical movement and for restricting the rotative movement thereof, said means including oppositely extending portions on said brake-shoe, and ribs on the side walls of the journal box adapted to register with the oppositely extending portions of the brake-shoe, an air cylinder on said journal box, a piston in said cylinder, an extension on said piston constructed and arranged to press said brake-shoe into braking engagement with said car axle journal, and a recess on said brake-shoe adapted to receive the extension of the piston.

In testimony whereof I have signed my name to this specification.

GORDON W. FRANZEN.